(No Model.)

M. A. LINDER.
RUNNER ATTACHMENT FOR VEHICLE WHEELS.

No. 413,450. Patented Oct. 22, 1889.

WITNESSES:
E. B. Bolton
L. Almqvist

INVENTOR:
Mons A. Linder
By A. W. Almqvist
his Attorney.

UNITED STATES PATENT OFFICE.

MONS A. LINDER, OF PULLMAN, ILLINOIS.

RUNNER ATTACHMENT FOR VEHICLE-WHEELS.

SPECIFICATION forming part of Letters Patent No. 413,450, dated October 22, 1889.

Application filed April 15, 1889. Serial No. 307,356. (No model.)

*To all whom it may concern:*

Be it known that I, MONS A. LINDER, a citizen of the United States of America, residing at Pullman, in the county of Cook and State of Illinois, have invented certain new and useful Improvements in Runner Attachments for Vehicle-Wheels; and I do hereby declare the following to be a full, clear, and exact description of the invention, such as will enable others skilled in the art to which it appertains to make and use the same.

My invention consists of an improved vehicle-wheel-runner attachment for each wheel separately, as hereinafter fully described, reference being made to the accompanying drawings, in which—

Figure 1:
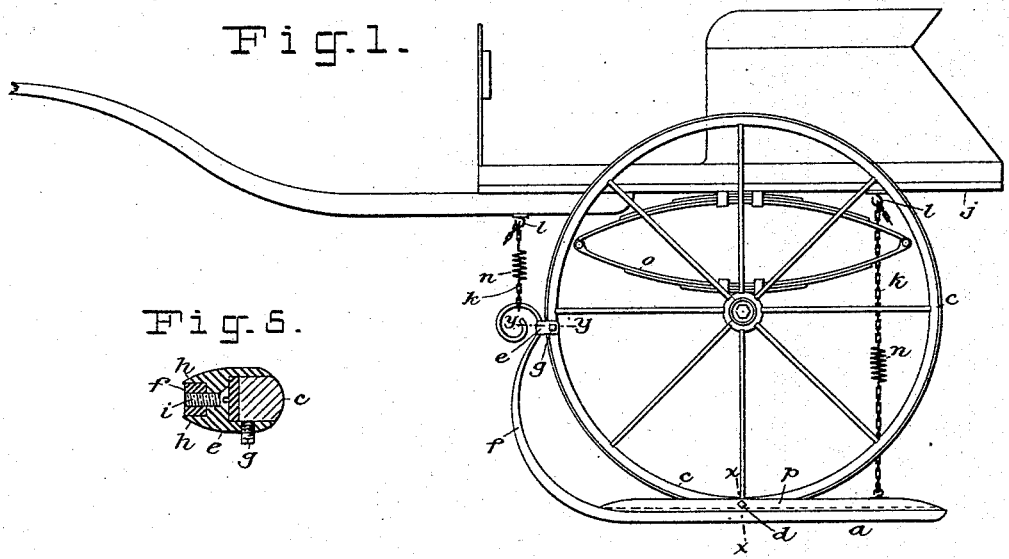
Figure 6:
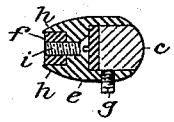
Figure 3:
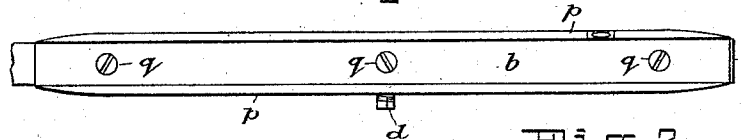
Figure 4:
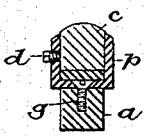
Figure 2:
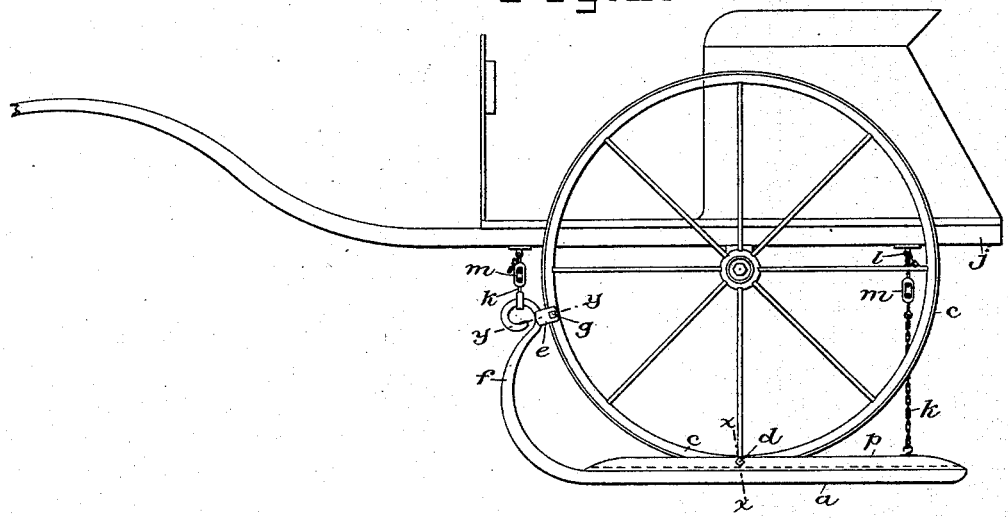

Figure 1 is a side elevation of a spring-cart having my improved runner attachment applied to one of the wheels. Fig. 2 is a similar view showing the application of the attachment to a cart made without springs. Fig. 3 is a plan view of the principal part of the runner attachment. Fig. 4 is a section of Figs. 1 and 2 on line $x\,x$. Fig. 5 is a section of Figs. 1 and 2 on line $y\,y$. The last three figures are on an enlarged scale.

I provide a runner $a$ for each wheel, having a channel-way $b$ along the top adapted to receive the tread or rim of the vehicle-wheel $c$, and provided with a binding-screw $d$ in one of the side walls of the channel-way, adapted to secure the wheel by screwing against the side of the wheel-rim, said runner also having a clip $e$ attached to the rear side of the upper part of the "goose-neck" $f$, and being open rearward, so as to receive the wheel-rim as the wheel rolls along the channel-way, and at a point about or nearly as high as the axle, and secure it by a binding-screw $g$ through one side of the clip, said clip being secured to the goose-neck by its lips $h$, embracing the sides, and the screw $i$, screwing into the goose-neck from the bottom of the clip, but said clip may be secured in any other approved way; and at the front and back of the wheel, respectively, I connect the runner and vehicle-bed frame $j$ by the tension-chains $k$, to more permanently secure the runners, and when the vehicle is a cart to balance it on the runners. The chains connect with the bed-frame by the hooks $l$, attached to the latter to connect with whatever link makes a taut connection, and they have a swivel $m$ or spring $n$ to take up the slack. The swivel is preferred when the body rests positively on the axle, as in Fig. 2, and the springs are better when the vehicle-body is mounted with interposed springs, as $o$, or any other form of spring.

The channel-way $b$ is made of a channel-bar $p$, constructed separately from the runner and attached to the upper side by screws $q$, as clearly represented in Figs. 3 and 4.

My improved attachment is more particularly useful for carts; but it is manifest that it is useful also for other vehicles.

I claim as my invention—

1. The improved runner attachment for vehicle-wheels, consisting of a runner having the channel-way and binding-screw in the upper side, the clip and binding-screw on the goose-neck, and the tension-chains at the front and rear of the runner, respectively, and adapted to connect with the bed-frame of the wheel, and said channel-way and clip adapted to secure the wheel-rim, substantially as described.

2. The improved runner attachment for vehicle-wheels, consisting of a runner having the channel-way and binding-screw in the upper side, the clip and binding-screw on the goose-neck, and the tension-chains at the front and rear, respectively, said chains having tension-adjusting devices and adapted to connect with the bed-frame of the vehicle, and said channel-way and clip adapted to receive and secure the wheel-rim, substantially as described.

3. The combination, with the wheels of a vehicle, of a runner attachment to each wheel, consisting of a runner having the channel-way and binding-screw in the upper side, the clip and binding-screw on the goose-neck, and the tension-chains at the front and rear of the runner, respectively, said chains adapted to connect with the bed-frame of the vehicle, and said channel-way and clip adapted to receive and secure the wheel-rim, substantially as described.

4. The combination, with the wheels of a vehicle, of a runner attachment to each wheel, consisting of a runner having the channel-way and binding-screw in the upper side, the clip and binding-screw on the goose-neck, and the tension-chains at the front and rear of the runner, respectively, said chains having tension-adjusting devices and adapted to connect with the bed-frame of the vehicle, and said channel-way and clip adapted to receive and secure the wheel-rim, substantially as described.

5. The combination, in a runner attachment for vehicle-wheels, of the runner $a$, the channel-bar $p$, attached to the upper side of the runner, and the binding-screw $d$ in the side of the channel-bar, substantially as described.

6. The improvement in the construction of a runner attachment for vehicle-wheels, consisting of the runner $a$, having the gooseneck $f$, the separately-constructed channel-bar $p$, attached to the upper side of the runner, and the clip $e$, attached to the gooseneck, said channel-bar and clip being adapted to receive the wheel-rim by rolling it along the channel, and having binding-screws in the sides, and all combined substantially as described.

In testimony whereof I affix my signature in presence of two witnesses.

MONS A. LINDER.

Witnesses:
CARL S. BERGMAN,
WM. W. STEWART.